United States Patent Office 3,267,175
Patented August 16, 1966

3,267,175
BLENDS OF EPSILON CAPROLACTAM, LOW BUTADIENE ACRYLONITRILE-BUTADIENE-STYRENE GRAFT COPOLYMER AND HIGH BUTADIENE ACRYLONITRILE-BUTADIENE-STYRENE GRAFT COPOLYMER
Thomas S. Grabowski, Vienna, W. Va., assignor to Borg-Warner Corporation, Chicago, Ill., a corporation of Illinois
No Drawing. Filed July 21, 1961, Ser. No. 125,675
4 Claims. (Cl. 260—857)

The present invention relates to synthetic resins having new and unique properties and more particularly to a synthetic resin blend which is easily processed into structural shapes and which has over-all physical properties desirable for many applications.

The polymer of *epsilon* caprolactam has many desirable properties for the fabrication of structural shapes, such as tensile strength, elongation, hardness, and stability in the presence of solvents. However, the polymer has a relatively low impact strength, especially at low temperature, and a low heat deflection temperature. Graft copolymers of acrylonitrile, butadiene, and styrene also have many desirable physical properties making them useful for many structural shapes, such properties being high impact strength at both room and low temperatures, 73° F. and —40° F. respectively, and a relatively high heat deflection temperature. Also, these graft copolymers are difficult to process by the injection molding technique.

In application S.N. 115,897 filed June 9, 1961, Patent No. 3,134,746, the blending of an acrylonitrile-butadiene-styrene graft copolymer with the polycondensate of *epsilon* caprolactam is disclosed. It has also been found that a plastic having excellent physical properties for such applications as television and radio cabinets, where impact strength and high heat deflection temperatures are critical, can be obtained by blending two different acrylonitrile-butadiene-styrene graft copolymers with the polymer of *epsilon* caprolactam.

One of the objects of the present invention, therefore, is to improve the injection moldability of acrylonitrile-butadiene-styrene graft copolymers.

Another object of the invention is to improve the impact strength of polymerized *epsilon* caprolactam.

Still another object of the invention is to improve the heat deflection temperature of polymerized *epsilon* caprolactam.

These and other objects are obtained by the blending of polymerized *epsilon* caprolactam with two different graft copolymers, each prepared by polymerizing an alkenyl cyanide and a vinyl aromatic hydrocarbon in the presence of polybutadiene or a copolymer of butadiene and styrene.

THE CAPROLACTAM POLYMER

The polymerized *epsilon* caprolactam utilized in the blends of the present invention has the following physical properties.

| | |
|---|---|
| Tensile strength p.s.i. at 73° F. | 9000 |
| Elongation 73° F., percent | 250 |
| Izod impact strength 73° F. | 2.3 |
| Izod impact strength —40° F. | 0.7 |
| Heat deflection temperature ° F. ½" x ½" x 5" 264 p.s.i. | 122 |
| Hardness (R scale) | 104 |

The caprolactam polymer is easily processed by the injection molding technique due to its transition to a liquid at temperatures of 390° to 450° F.

THE GRAFT COPOLYMERS

Within recent years it has become increasingly common practice to prepare polymeric products by the so-called "graft" copolymerization technique. As may be determined by reference to the Report on Nomenclature of the International Union of Pure and Applied Chemistry (published in the Journal of Polymer Science, vol. 8, page 260, 1952), the term "graft copolymerization" is employed to designate the process wherein a polymerizable monomer (or mixture of polymerizable monomers) is reacted, under polymerizing conditions, in the presence of a previously formed polymer or copolymer. "A graft copolymer is a high polymer, the molecules of which consist of two or more polymeric parts, of different composition, chemically united together. A graft copolymer may be produced, for example, by polymerization of a given kind of monomer with subsequent polymerization of another kind of monomer onto the product of the first polymerization."

Graft polymers suitable for use in the production of the blends of this invention may be prepared by the interaction, under polymerizing conditions, of a mixture of an alkenyl cyanide and a vinyl aromatic hydrocarbon, exemplified respectively by acrylonitrile and styrene, with a polybutadiene latex. The graft copolymers comprise about 40%–90% by weight combined acrylonitrile plus styrene and about 60% to 10% by weight (dry basis) polybutadiene. The acrylonitrile preferably comprises from 5%–30% by weight of the three component graft copolymers (acrylonitrile plus styrene plus polybutadiene), the styrene 30%–80% by weight and the polybutadiene, correspondingly, 10%–60% by weight of the three component graft copolymers.

For the better understanding of this invention, the following example sets forth a description of the preparation of two representative graft copolymers suitable for use in forming the new and improved blends of this invention.

Example I

| | X | Y |
|---|---|---|
| Polybutadiene | 20.0 | 50 |
| Acrylonitrile | 29.0 | 18 |
| Styrene | 51.0 | 32 |
| Cumene hydroperoxide | 0.7 | 0.86 |
| Sodium salt of hydrogenated disproportionated rosin | 2.1 | 1.96 |
| Sodium pyrophosphate | 0.46 | 0.25 |
| Sodium hydroxide | 0.1 | 0.15 |
| Dextrose | 1.0 | 1.0 |
| Ferrous sulfate | 0.006 | 0.011 |
| Water, including water present in the polybutadiene latex | 216 | 196 |

The recipes were separately introduced into glass reactors which were sealed and tumbled for six hours in a water bath heated to 65–85° C. At the end of this time, reaction was essentially complete. The copolymers formed were recovered as follows: The final reaction mixtures were coagulated with dilute brine and sulfuric acid, heated to 95° C. to produce partial granulation of the coagulated product to facilitate subsequent filtration and washing operations, filtered, washed and finally dried to constant weight at 110° C.

Certain physical properties of the graft copolymers prepared as above described are tabulated below:

| Graft copolymer | X | Y |
|---|---|---|
| Izod Impact Strength, 73° F. ft. lb./inch notch ⅛" | 8.5 | 6.9 |
| Izod Impact Strength, —40° F. ft. lb./inch notch ⅛" | 2.7 | 7.3 |
| Tensile Strength, p.s.i. 73° F. | 6,000 | 2,700 |
| Tensile Elongation, 73° F., percent | 15 | 155 |
| Deflection Temperature ° F. ½" x ½" x 5" bar 264 p.s.i. | 184 | 170 |
| Hardness Rockwell R | 99 | 25 |

Example 2

Graft copolymers X and Y were blended with polymerized *epsilon* caprolactam at various parts-by-weight ratios. In making the blends, the graft copolymers and the caprolactam polymer were mixed with 1.5 parts by weight Acrawax C, an N,N-ethylene bis-stearamide and the mixture was fed into an extruder and extruded at a temperature of 400° F. (the extrusion temperature must be above the melting point of the caprolactam polymer), sheeted, and pelletized. The pellets were injection molded at 450° F. into physical test specimens. The amount of each component polymer and the phyiscal properties of each blend are shown in the following table:

TABLE I

| Sample | A | B | C |
|---|---|---|---|
| *Epsilon* caprolactam polymer | 5 | 10 | 30 |
| Graft copolymer X | 47.5 | 45 | 35 |
| Graft copolymer Y | 47.5 | 45 | 35 |
| Tensile Strength, p.s.i. 73° F | 4,300 | 4,200 | 4,600 |
| Elongation, 73° F., percent | 110 | 155 | 190 |
| Izod Impact Strength, 73° F. ft. lb./in. notch $\frac{1}{8}''$ | 8.2 | 8.8 | 9.9 |
| Izod Impact Strength, −40° F. ft. lb./in. notch $\frac{1}{8}''$ | 3.1 | 2.8 | 1.7 |
| Heat Deflection Temperature ° F. $\frac{1}{2}'' \times \frac{1}{2}'' \times 5''$ 12 p.s.i. | 210 | 210 | 224 |
| Heat Deflection Temperature ° F. $\frac{1}{2}'' \times \frac{1}{2}'' \times 5''$ 264 p.s.i. | 174 | 173 | 164 |
| Hardness (R Scale) | 80 | 80 | 78 |

Blends prepared in accordance with this invention may contain additional components, such as pigments, fillers, and the like, which are frequently incorporated into resins and resin blends in accordance with conventional practices well known to those skilled in the art.

While the blends of the present invention may range, in parts by weight, from 5 to 95 parts caprolactam polymer and correspondingly from 95 parts to 5 parts of graft copolymer, the preferred ranges are in the neighborhood of 50 parts by weight of each polymer.

An additional advantage obtained from the present invention is that if the blends contain as much as 30 parts by weight caprolactam polymer, the composition is practically insoluble and unaffected by solvents that normally dissolve the graft copolymer components, e.g. methyl ethyl ketone, methyl isobutyl ketone, and the like. The blends also have much greater stress corrosion than the graft copolymers alone.

In the preparation of the graft copolymer blending components of this invention, the styrene may be replaced, in part or entirely, by alpha methyl styrene, vinyl toluenes and alpha methyl vinyl toluene, including mixtures of two or more such hydrocarbons. Also, the acrylonitrile may be replaced, in part or entirely, with other alkenyl cyanides such as methacrylonitrile and ethacrylonitrile.

The blends of the present invention find their greatest usefulness in the fabrication of shaped articles which are subject to shock and extremes of heat or cold, such as for example, radio and television cabinets, pipe, luggage, industrial and sports helmets and the like articles.

While this invention has been described in connection with certain specific details and examples thereof, these details and examples are illustrative only and are not to be considered limitations on the spirit or scope of the invention except insofar as these may be incorporated in the appended claims.

I claim:

1. A composition comprising a blend of (a) about 5 to 30 parts by weight of polymerized *epsilon* caprolactam, (b) about 47.5 to 35 parts by weight of a graft copolymer of (1) about 20 parts by weight polybutadiene and (2) a mixture of about 29 parts by weight of acrylonitrile and about 51 parts by weight of styrene, and (c) about 47.5 to 35 parts by weight of a graft copolymer of (1) about 50 parts by weight polybutadiene and (2) a mixture of about 18 parts by weight of acrylonitrile and about 32 parts by weight of styrene.

2. A composition comprising a blend of (a) about 5 parts by weight of polymerized *epsilon* caprolactam, (b) about 47.5 parts by weight of a graft copolymer of (1) about 20 parts by weight polybutadiene and (2) a mixture of about 29 parts by weight of acrylonitrile and about 51 parts by weight of styrene, and (c) about 47.5 parts by weight of a graft copolymer of (1) about 50 parts by weight polybutadiene and (2) a mixture of about 18 parts by weight of acrylonitrile and about 32 parts by weight of styrene.

3. A composition comprising a blend of (a) about 10 parts by weight of polymerized *epsilon* caprolactam, (b) about 45 parts by weight of a graft copolymer of (1) about 20 parts by weight polybutadiene and (2) a mixture of about 29 parts by weight of acrylonitrile and about 51 parts by weight of styrene, and (c) about 45 parts by weight of a graft copolymer of (1) about 50 parts by weight polybutadiene and (2) a mixture of about 18 parts by weight of acrylonitrile and about 32 parts by weight of styrene.

4. A composition comprising a blend of (a) about 30 parts by weight of polymerized *epsilon* caprolactam, (b) about 35 parts by weight of a graft copolymer of (1) about 20 parts by weight polybutadiene and (2) a mixture of about 29 parts by weight of acrylonitrile and about 51 parts by weight of styrene, and (c) about 35 parts by weight of a graft copolymer of (1) about 50 parts by weight polybutadiene and (2) a mixture of about 18 parts by weight of acrylonitrile and about 32 parts by weight of styrene.

References Cited by the Examiner

UNITED STATES PATENTS 2,802,808  8/1957  Hayes _____ 260—880

FOREIGN PATENTS 533,897  11/1956  Canada.

SAMUEL H. BLECH, *Primary Examiner.*

WILLIAM H. SHORT, LEON J. BERCOVITZ,
*Examiners.*

N. W. SHUST, *Assistant Examiner.*